US010046984B2

(12) United States Patent
Gantenbein et al.

(10) Patent No.: US 10,046,984 B2
(45) Date of Patent: Aug. 14, 2018

(54) ADSORBING AND/OR REDUCTION OF THE AMOUNT OF ORGANIC MATERIALS IN AN AQUEOUS MEDIUM BY USING COLLOIDAL PRECIPITATED CALCIUM CARBONATE

(71) Applicant: Omya International AG, Oftringen (CH)

(72) Inventors: Daniel Gantenbein, Basel (CH);
Patrick A. C. Gane, Rothrist (CH);
Joachim Schoelkopf, Oberkulm (CH);
Juhana Tuomas Lehtipuu, Hélsinki (FI)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/129,524

(22) PCT Filed: Apr. 13, 2015

(86) PCT No.: PCT/EP2015/057967
§ 371 (c)(1),
(2) Date: Sep. 27, 2016

(87) PCT Pub. No.: WO2015/158657
PCT Pub. Date: Oct. 22, 2015

(65) Prior Publication Data
US 2017/0174533 A1 Jun. 22, 2017

(30) Foreign Application Priority Data
Apr. 16, 2014 (EP) .................................. 14164890

(51) Int. Cl.
| | | |
|---|---|---|
| *D21H 21/02* | (2006.01) | |
| *C02F 1/28* | (2006.01) | |
| *D21C 9/08* | (2006.01) | |
| *B01J 20/28* | (2006.01) | |
| *B01J 20/04* | (2006.01) | |
| *C02F 101/30* | (2006.01) | |
| *C02F 103/28* | (2006.01) | |
| *C02F 103/30* | (2006.01) | |
| *C02F 103/32* | (2006.01) | |

(52) U.S. Cl.
CPC ............ *C02F 1/281* (2013.01); *B01J 20/043* (2013.01); *B01J 20/28004* (2013.01); *B01J 20/28059* (2013.01); *B01J 20/28061* (2013.01); *D21C 9/083* (2013.01); *D21H 21/02* (2013.01); *C02F 2101/305* (2013.01); *C02F 2101/308* (2013.01); *C02F 2103/28* (2013.01); *C02F 2103/30* (2013.01); *C02F 2103/325* (2013.01)

(58) Field of Classification Search
CPC .............. C02F 1/281; C02F 2101/305; C02F 2103/28; D21H 21/02; D21C 9/083; B01J 20/043; B01J 20/28061; B01J 20/28004; B01J 20/28059

USPC ....................................... 162/181.2
See application file for complete search history.

(56) References Cited

U.S. PATENT DOCUMENTS

| | | | |
|---|---|---|---|
| 5,626,720 A | 5/1997 | Hassler | |
| 5,798,023 A | 8/1998 | Pruszunski et al. | |
| 6,051,160 A | 4/2000 | Hlivka et al. | |
| 6,153,049 A | 11/2000 | Croft | |
| 2003/0096143 A1 | 5/2003 | Lasmarias et al. | |
| 2004/0231816 A1 | 11/2004 | Steeg et al. | |
| 2009/0308553 A1 | 12/2009 | Souzy et al. | |
| 2010/0059708 A1* | 3/2010 | Gane ..................... | B01J 20/043 252/182.32 |
| 2011/0094695 A1 | 4/2011 | Jiang et al. | |
| 2011/0195837 A1* | 8/2011 | Gane ..................... | B01J 20/043 502/416 |
| 2015/0044127 A1* | 2/2015 | Gantenbein ............. | D21C 9/08 423/580.1 |

FOREIGN PATENT DOCUMENTS

| | | |
|---|---|---|
| CA | 2205277 A1 | 11/1997 |
| EP | 0344984 A2 | 12/1989 |
| EP | 0586755 A1 | 3/1994 |
| EP | 0740014 A1 | 10/1996 |
| EP | 1950342 A1 | 7/2008 |
| EP | 1974807 A1 | 10/2008 |
| EP | 2546410 A1 | 1/2013 |
| EP | 2712895 A1 | 4/2014 |
| FR | 2900410 A1 | 11/2007 |
| FR | 2900411 A1 | 11/2007 |
| JP | 2002212897 A1 | 7/2002 |
| JP | 2004292998 A | 10/2004 |
| JP | 2006065892 A | 3/2006 |
| JP | 2011043895 A1 | 3/2011 |
| RU | 2377189 C2 | 6/2009 |
| WO | 9805819 A1 | 2/1998 |
| WO | 03085199 A2 | 10/2003 |
| WO | 2006029404 A1 | 3/2006 |
| WO | 2008113838 A1 | 9/2008 |
| WO | 2012010466 A1 | 1/2012 |
| WO | 2013007717 A1 | 1/2013 |

OTHER PUBLICATIONS

Peng et al. "Effect of cationic polyacrylamide on precipitated calcium carbonate flocculation: Kinetics, charge density and ionic strength." Colloids and Surfaces A: Physicochem. Engl. Aspects 408 (2012) 32-39.
The International Search Report dated Jul. 6, 2015 for PCT/EP2015/057967.
The Written Opinion of the International Searching Authority dated Jul. 6, 2015 for PCT/EP2015/057967.
Office Action dated Nov. 7, 2016 from Australian Patent Application No. 2015248940.

(Continued)

*Primary Examiner* — Mark Halpern
(74) *Attorney, Agent, or Firm* — Amster, Rothstein & Ebenstein LLP

(57) ABSTRACT

The present invention relates to the use of a colloidal precipitated calcium carbonate (cPCC) for adsorbing and/or reducing the amount of at least one organic material in an aqueous medium.

35 Claims, 5 Drawing Sheets

(56) References Cited

OTHER PUBLICATIONS

Notice of Acceptance of Application dated Apr. 7, 2017 from Australian Patent Application No. 2015248940.
Office Action dated Jul. 25, 2017 from Canadian Patent Application No. 2,944,098.
European Search Report dated Sep. 4, 2014 from European Patent Application No. 14164890.7.
International Preliminary Report on Patentability dated Oct. 27, 2016 from International Application No. PCT/EP2015/057967.
Office Action dated Oct. 24, 2017 from Japanese Patent Application No. 2016-562850.
Office Action dated Oct. 24, 2017 from Russian Patent Application No. 2016144691.
Written Opinion dated Oct. 24, 2017 from Singapore Patent Application No. 11201608096X.

* cited by examiner

ADSORBING AND/OR REDUCTION OF THE AMOUNT OF ORGANIC MATERIALS IN AN AQUEOUS MEDIUM BY USING COLLOIDAL PRECIPITATED CALCIUM CARBONATE

CROSS-REFERENCE TO RELATED APPLICATIONS

This is a U.S. national phase of PCT Application No. PCT/EP2015/057967, Apr. 13, 2015, which claims priority to European Application No. 14164890.7, filed Apr. 16, 2014.

The present invention relates to the use of a colloidal precipitated calcium carbonate (cPCC) for adsorbing and/or reducing the amount of at least one organic material in an aqueous medium.

In paper making industries, fibres from various sources and qualities are obtained by processing and refining, e.g. by combinations of grinding, thermal and chemical treatment, wood into fibres. During this pulping process organic materials contained within the wood are released into the water circuit of the production in the form of dissolved and colloidal substances (DCS), also called pitch. However, the dissolved and colloidal substances may circulate in the internal water loops in the form of small droplets which can deposit on the surface of the papermaking equipment and thus can cause time consuming cleanings of the equipment and expensive downtimes of the machines. Furthermore, such deposits occasionally appear as visible spots in the final paper product ranging from yellow to black in colour, or can lead to a tear of the paper web involving a loss of output and a reduction in paper quality.

The droplets of dissolved and colloidal substances are typically formed in that the dissolved and colloidal substances are diffused out of the wood cells or squeezed out from broken cells. Due to the high pulping temperature of about 80 to 180° C. and high ionic strength of the aqueous environment a lamellar liquid crystalline structure phase is formed, which further goes on to form a lipophilic colloidal system, i.e. separate droplets. Typically, the hydrophobic part of the wood resin components such as triglycerides, steryl esters, waxes as well as the hydrophobic backbones of resin and fatty acids, sterols and fatty alcohols preferably assemble in the centre of the droplets. The hydrophilic uncharged groups of e.g. alcohols such as sterols and fatty alcohols, as well as the hydrophilic head groups of the resin and fatty acids and of their soaps are located on the surface of the droplets and especially the latter determine the electrostatic stabilization of this system. The afore-mentioned compounds are in equilibrium with the aqueous environment and may dissolve as a result of pH, temperature or ionic strength change. Furthermore, hydrophilic water soluble polymers such as hemicelluloses or lignosulphonates may adsorb onto the droplets and contribute to their colloidal stabilization by steric or electrostatic interactions. Compared to the content of the droplets, these hydrophilic water soluble polymers are in excess and occur in equilibrium between the droplet surface and aqueous environment. Said droplets are typically in the size range of 10 to 2 000 nm. Such droplet formation can also be a problem in recycled or secondary fibre processes where organic materials such as adhesives, inks, hot melts, latexes and waxes agglomerate and form deposits on papermaking equipment.

A differentiation and separation of dissolved substances and droplets comprising the colloidal substances can be obtained by membrane filtration using 0.1 or 0.2 µm filters. For example, it is appreciated that everything retained by the filter is considered as colloidal substances and everything passing through the filter is dissolved substances. Alternatively, a differentiation can be reached by turbidity measurements in that substances that cause turbidity are considered as part of the colloidal substances and include mainly hydrophobic wood resin with adsorbed hemicelluloses. The dissolved substances are typically quantified indirectly by subtracting the amount of colloidal material from the total organic material.

In the art, several attempts have been made to control the deposition of dissolved and colloidal substances in paper making processes. In this regard, one strategy involves the introduction of adsorbing materials in the form of various minerals such as talc, bentonite or diatomaceous silica to the papermaking process, which will adsorb said substances in the form of small droplets.

For example, JP 2004292998 A relates to talc which is used as pitch adsorbent. WO 03/085199 A2 relates to a deposit control system consisting of an inorganic or organic coagulant and a microparticulate material such as bentonite clay, cross-linked polymer, colloidal silica, polysilicate for pulp containing white pitch/stickies. US 2003/0096143 A1 describes a method of treating talc particles that will improve talc's wettability and/or talc's affinity to cellulosic fibres. JP 6065892 A refers to a pitch adsorbent composed of magnesium-modified smectite clay mineral produced by modifying the surface layer of a smectite clay mineral with magnesium. FR 2 900 410 and FR 2 900 411 refer to the treatment of minerals and/or talc with amphoteric polymers to be used in pitch control. CA 2,205,277 refers to a method for minimizing pitch, ink, and stickies particulate deposits in the paper making process by causing the retention of such particles onto fibre, comprising the steps of adding an effective pitch, ink, and stickies controlling amount of talc to a suspension of fibre in contact with the paper machine and associated parts and adding an effective pitch, ink, and stickies controlling amount of bentonite to the suspension. WO 2009/034056 A1 relates to the use of carbon dioxide for the removal of stickies from a pulp suspension containing recycled fibers and for decreasing the content of calcium carbonate in flotation reject. WO 2006/029404 A1 refers to the removal and/or control of adhesives or sticky materials from recovered paper stock or virgin pulp fibers by using a combination of enzyme treatment with adsorbents and/or absorbents, wherein the adsorbents include activated bentonite, microparticles, talc, clay and modified silica. P. L. Whiting, Contaminent control on a high speed paper machine, 1997 Engineering & Papermakers conference, TAPPI proceedings, p. 661-668, refers to the reduction of sticky deposits on paper manufacturing machines by adding undispersed scalenohedral shaped PCC particles. J. Klungness et al, Micro and Colloidal Stickie Pacification with Precipitated Calcium Carbonate, Paper Technology, October 2004, p. 29-33, refers to the use of rhombohedral PCC to pacify or minimize microstickies in process water from recycled pulp. WO 2008/113839 relates to a process for the control of pitch in an aqueous medium by adding surface-reacted natural calcium carbonate or an aqueous suspension comprising surface-reacted calcium carbonate and having a pH greater than 6.0 measured at 20° C., to the medium. WO 2008/113838 relates to the removal of endocrine disrupting compounds from an aqueous medium by adding surface-reacted natural calcium carbonate or an aqueous suspension comprising surface-reacted calcium carbonate and having a pH greater than 6.0 measured at 20° C., to the medium. WO 2013/007717 relates to the use of a hydrophobised ground calcium carbonate and/or a hydrophobised precipitated calcium carbonate for reducing the amount of pitch in an aqueous medium.

This strategy has the advantage that the dissolved and colloidal substances are removed with the final product and cannot, thus, concentrate further in the water circuit of the paper machine. In particular, talc is widely accepted as a very effective control agent for pitch deposits. The action of talc in controlling dissolved and colloidal substances, however, is not exactly established. It is assumed that talc reduces the tackiness of such substances such that they have fewer tendencies to form droplets or deposits onto paper making equipment or to create spots in the final paper product. Also, the function of talc is to reduce tackiness of materials that already have deposited, so that further accumulation of tacky materials on those surfaces is slowed down. Hereby it is important to add enough talc so that the overall tackiness of the surfaces in the system is reduced.

One problem with talc however is that if not enough talc is used, it tends to be merely incorporated into deposits and agglomerates of tacky materials. Furthermore, talc is known to lose a part of its affinity for colloidal substances in neutral and alkaline paper making processes.

Another strategy involves the colloidal stabilization or fixation and retention of the dissolved and colloidal substances by the use of dispersants or surfactants. The application of this strategy leads to a concentration of the pitch droplets in the paper machine water circuit. For example, EP 0 740 014 refers to a pitch control agent that may comprise a kandite clay (serpentine group) whose particles are coated with a homo- or co-polymer comprising melamine formaldehyde. U.S. Pat. No. 5,626,720 A describes a method for the control of pitch in an aqueous system used in pulp or paper making is disclosed which comprises adding to the system, or to the pulp making or paper making machinery, a water soluble polymer derived from (a) an epihalohydrin, a diepoxide or a precursor of an epihalohydrin or diepoxide, (b) an alkyl amine having a functionality with respect to an epihalohydrin of 2 and (c) an amine which has a functionality with respect to an epihalohydrin greater than 2 and which does not possess any carbonyl groups. JP 11043895 A refers to pitch suppressant by using a cationic compound that is prepared by reaction of an alkylenediamine with an epihalohydrin. WO 98/05819 A1 relates to a liquid composition for the control of pitch deposition in pulp and paper making comprising an aqueous solution of (1) a cationic guar polymer, and (2) isobutylene/maleic anhydride copolymer. EP 0 586 755 A1 describes a process for controlling the deposition of pitch in a pulping or paper making process, wherein there is incorporated into the composition comprising paper making fibres up to 1.0% by weight, based on the weight of dry fibres in the composition, of a cationic polyelectrolyte which is a poly(diallyl di(hydrogen or lower alkyl) ammonium salt) having a number average molecular weight greater than 500,000. US 2011/0094695 A1 describes a method for controlling the deposition of organic contaminants from the pulp and papermaking systems using water soluble aminoplast ether copolymers. EP 1 950 342 A1 refers to aqueous emulsions comprising dialkylamides and non-ionic surfactants. US 2004/0231816 A1 describes a method for controlling pitch and stickies comprising the steps of adding hydrophobically modified hydroxyethyl cellulose (HMHEC) and cationic polymers to a cellulosic fibre slurry (pulp) or to a paper process or to a paper making system and results in a higher degree of inhibiting organic deposition and retention of pitch on paper fibre as compared to the inhibition of the individual ingredients. U.S. Pat. No. 6,153,049 refers to ethyleneamine compound(s), or mixtures thereof, which are used in effective amounts to reduce or inhibit the deposition of white pitch on the paper making equipment during the processing to recycle coated paper. U.S. Pat. No. 6,051,160 A relates to a liquid composition for the control of pitch deposition in pulp and paper making comprising an aqueous solution of (1) a derivatized cationic guar, and (2) styrene maleic anhydride copolymer. JP 2002212897 A refers to a pitch trouble inhibitor for paper making comprising a polydiallyldimethylammonium salt having 20,000-200,000 molecular weight and an inorganic aluminium compound as active ingredients.

However, this strategy often causes problems because changes in temperature, pH or electrolyte concentrations can result in agglomeration with consequent deposition of organic material droplets on the surface of the machine equipment and/or the appearance of spots in the final paper product.

Therefore, there is a continuous need for alternative materials, which provide a better performance than existing adsorbing materials, and effectively adsorb and/or reduce the amount of organic materials in an aqueous medium generated in papermaking or pulping processes.

This and other objects are solved by the subject-matter of the present invention. According to the present invention, the use of a colloidal precipitated calcium carbonate (cPCC) for adsorbing and/or reducing the amount of at least one organic material in an aqueous medium is provided, wherein the cPCC has a specific surface area of at least 5.0 m$^2$/g, measured using nitrogen and the BET method.

DETAILED DESCRIPTION

Figure 1:
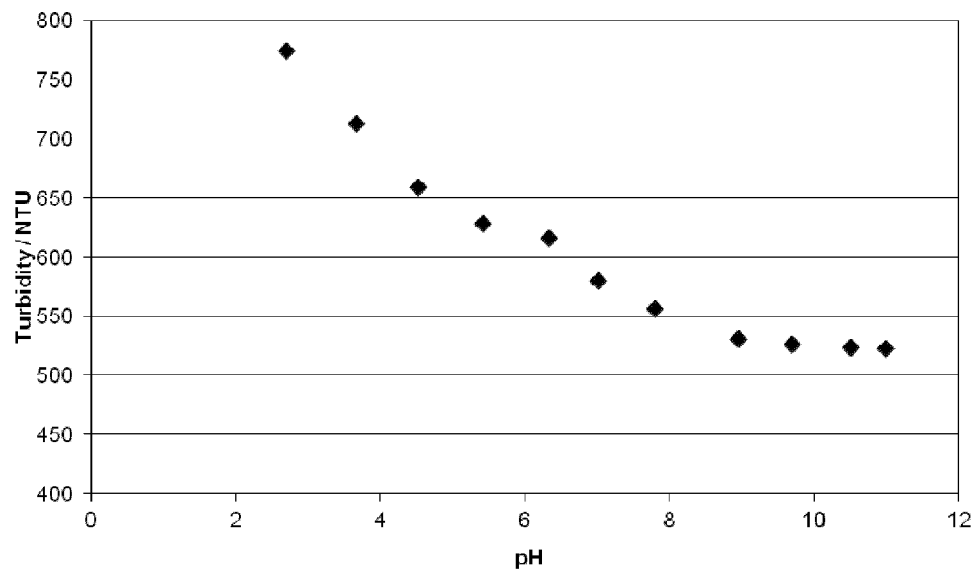
FIG. 1: Shows TMP filtrate was titrated versus pH and turbidity was recorded.

The inventors surprisingly found that the foregoing use according to the present invention leads to an aqueous medium containing an amount of organic materials being lower than the amount of organic materials contained in a corresponding aqueous medium obtained by the same process but without contacting it with a colloidal precipitated calcium carbonate (cPCC). More precisely, the inventors found that at least one organic material in an aqueous medium, preferably generated in a papermaking or pulping process, can be adsorbed and/or reduced by contacting the aqueous medium with a defined colloidal precipitated calcium carbonate (cPCC).

It should be understood that for the purposes of the present invention, the following terms have the following meaning:

"Colloidal precipitated calcium carbonate" (cPCC) refers to a precipitated calcium carbonate product in the form of aggregates of individual PCC particles. The term "precipitated calcium carbonate" (PCC) in the meaning of the present invention is a synthesized material, generally obtained by precipitation following reaction of carbon dioxide and milk of lime in an aqueous medium under suitable conditions and is well known in the art; see e.g. H. Yamada et al., Formation process of colloidal calcium carbonate in the reaction of the system $Ca(OH)_2$—$H_2O$—$CO_2$, Gypsum & Lime, 1985, no. 194, p. 3-12.

"Organic materials" in the meaning of the present invention refers to the tacky materials of dissolved and colloidal substances (DCS) which form insoluble deposits in pulping and paper making processes. These tacky materials typically originate from the wood from which the paper is made. Said dissolved and colloidal substances (DCS) are characterized by four classes of lipophilic components such as i) fats and fatty acids, ii) steryl esters and sterols, iii) terpenoids, and iv) waxes comprised of fatty alcohols and esters and preferably form small droplets. The chemical composition of the droplets depends on the fibre source, such as variety of tree, and on the seasonal growth from which the sample is produced. The lipophilic components of the small droplets can be stabilised by the presence of lignosulphonates and further polysaccharides. If recycled paper is used in paper making processes, the term may be also used as a more general term including all sticky materials which are soluble in organic solvents but not soluble in water, and include, for example, latex, binder, ink or adhesive materials present in recycled paper. However, for purposes of this invention, the term "organic material" shall include not only naturally occurring dissolved and/or colloidal substances (DCS) derived from paper pulp, but also any synthetic or natural dissolved and/or colloidal substance derived from recycled fibres and which is considered as contaminant in paper making processes.

An "aqueous medium" in the meaning of the present invention comprises a liquid phase comprising, more preferably consisting of, water, at least one organic material and optionally insoluble solids such as fibres. However, said term does not exclude that the liquid phase comprises a water-miscible organic solvent selected from the group comprising alcohols such as methanol, ethanol, isopropanol, carbonyl-group containing solvents such as ketones, e.g. acetone or aldehydes, esters such as isopropyl acetate, carboxylic acids such as formic acid, sulfoxides such as dimethyl sulfoxide and mixtures thereof. If the liquid phase comprises a water-miscible organic solvent, the aqueous medium comprises the water-miscible organic solvent in an amount up to 40.0 wt.-% preferably from 1.0 to 30.0 wt.-% and most preferably from 1.0 to 25.0 wt.-%, based on the total weight of the liquid phase of the aqueous medium. For example, the liquid phase of the aqueous medium consists of water.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to one embodiment of the present invention, the cPCC has a specific surface area from 5.0 $m^2/g$ to 200.0 $m^2/g$, preferably from 10.0 $m^2/g$ to 100.0 $m^2/g$ and most preferably from 15.0 $m^2/g$ to 50.0 $m^2/g$, measured using nitrogen and the BET method.

According to another embodiment of the present invention, the cPCC comprises aggregates having a weight median particle diameter $d_{50}$ value from 0.1 to 50.0 µm, preferably from 0.2 to 25.0 µm, more preferably from 0.3 to 10.0 µm and most preferably from 0.4 to 5.0 µm, measured according to the sedimentation method.

According to yet another embodiment of the present invention, the cPCC aggregates consist of single crystals having a weight median particle diameter $d_{50}$ value from 0.01 to 5.0 µm, preferably from 0.02 to 2.5 µm, more preferably from 0.03 to 1.0 µm and most preferably from 0.04 to 0.5 µm, measured according to the sedimentation method.

According to one embodiment of the present invention, the cPCC is in powder form or in form of an aqueous suspension comprising the cPCC and having a pH of ≥6.0, measured at 20° C. (±1° C.).

According to another embodiment of the present invention, the cPCC is a) surface-treated with at least one aliphatic carboxylic acid having a total amount of carbon atoms from C4 to C24, preferably stearic acid, and/or b) stabilized with one or more dispersants, preferably one or more cationic and/or anionic dispersants.

According to yet another embodiment of the present invention, the cPCC is used in combination with at least one further adsorbing material selected from the group comprising talc, kaolin, calcined kaolin, natural calcium carbonate selected from marble, chalk, calcite, limestone and dolomite, non-colloidal PCC, gypsum, silicate-containing minerals, hydroxide-containing minerals, calcium sulfoaluminates, plastic particles, organic pigments, surface-reacted calcium carbonate, hydrophobised GCC, hydrophobised PCC and mixtures thereof, preferably talc, surface-reacted calcium carbonate, hydrophobised GCC, hydrophobised PCC and mixtures thereof.

According to one embodiment of the present invention, the amount of the at least one further adsorbing material is ≤25.0 wt.-%, preferably ≤10.0 wt.-%, more preferably ≤5.0 wt.-% and most preferably ≤2.0 wt.-%, based on the total dry weight of cPCC and the at least one further adsorbing material.

According to another embodiment of the present invention, the aqueous medium comprising at least one organic material is generated in a papermaking or pulping process, preferably the aqueous medium is selected from bleached and unbleached pulp such as mechanical pulp, ground pulp, thermomechanical pulp (TMP), chemothermomechanical pulp (CTMP), kraft pulp, sulfate pulp, recycled pulp and mixtures thereof.

According to yet another embodiment of the present invention, the at least one organic material in the aqueous medium is at least one dissolved and/or colloidal substance generated in a papermaking or pulping or paper recycling process.

According to one embodiment of the present invention, the at least one dissolved and/or colloidal substance is/are a) originated from wood and/or wood resins, preferably selected from the group comprising polysaccharides, such as hemicelluloses, lignin, starch and pectins, resin acids, fats, fatty acids, fatty alcohols, terpenes, terpenoids, polyisoprenes, sterols, steryl esters, waxes and mixtures thereof, and/or b) originated from paper coatings, coating binders, printing inks, de-inking chemicals, hot melts and/or adhesives.

According to another embodiment of the present invention, the cPCC is added to the aqueous medium in an amount from 0.05 to 90.0 wt.-%, preferably from 0.1 to 50.0 wt.-%, more preferably from 0.25 to 25.0 wt.-%, even more preferably from 0.5 to 10.0 wt.-% and most preferably from 0.5 to 5.0 wt.-%, based on the total weight of oven dry (100° C.) fibers in the aqueous medium.

According to yet another embodiment of the present invention, the at least one organic material in the aqueous medium is at least one endocrine disrupting compound (EDC), preferably the at least one EDC is selected from the group comprising endogenous hormones such as 17[beta]-estradiol (E2), estrone (E1), estriol (E3), testosterone or dihydro testosterone; phyto and myco hormones such as [beta]-sitosterol, genistein, daidzein or zeraleon; drugs such as 17[alpha]-ethinylestradiol (EE2), mestranol (ME), diethylstilbestrol (DES), and industrial chemicals such as 4-nonyl phenol (NP), A-tert-octyl phenol (OP), bisphenol A (BPA), tributyltin (TBT), methylmercury, phthalates, PAK or PCB.

According to one embodiment of the present invention, after the addition of the cPCC a) the turbidity of the aqueous medium is reduced compared to the turbidity of an aqueous medium without the use of the cPCC, and/or b) the chemical oxygen demand (COD) of the aqueous medium is reduced compared to the COD of an aqueous medium without the use of the cPCC, and/or c) the electrochemical charge (SCD) of the aqueous medium is increased compared to the electrochemical charge of an aqueous medium without the use of the cPCC.

According to another embodiment of the present invention, the aqueous medium, after the addition of the cPCC in an amount of at least 10 g/L aqueous medium, has a) a turbidity being at least 20%, preferably at least 40.0%, more preferably at least 50.0%, even more preferably at least 75.0% and most preferably at least 90.0% below the initial turbidity, i.e. the turbidity (NTU) of the aqueous medium before the addition of the cPCC, and/or b) a chemical oxygen demand (COD) being at least 1.0%, preferably at least 5.0%, more preferably at least 10.0%, even more preferably at least 15.0%, still more preferably at least 20.0% and most preferably at least 50.0% below the initial COD, i.e. the COD (mg/L) of the aqueous medium before the addition of the cPCC, and/or c) an electrochemical charge (SCD) being at least 5%, preferably at least 15.0%, more preferably at least 20.0%, even more preferably at least 25.0% and most preferably at least 50.0% above the initial electrochemical charge, i.e. the electrochemical charge ($\mu$Eq/g) of the aqueous medium before the addition of the cPCC.

In the following, it is referred to further details of the present invention and especially the foregoing colloidal precipitated calcium carbonate used for adsorbing and/or reducing the amount of organic materials in an aqueous medium.

In particular, it has been found out that the use of cPCC having a large surface area as an adsorbing aid makes it possible to adsorb and/or reduce the amount of at least one organic material in an aqueous medium. Compared with the previously described adsorbing aids, the use of cPCC has numerous advantages. It is cheap, has a higher adsorbing capability than other adsorbing aids such as GCC, PCC and/or talc and the obtained aqueous medium after contacting it with the cPCC comprises a reduced amount of at least one organic material.

It is thus one requirement of the present invention that a cPCC having a specific surface area of at least 5.0 m$^2$/g, measured using nitrogen and the BET method is used.

The cPCC preferably has a specific surface area of at least 10.0 m$^2$/g and more preferably of at least 15.0 m$^2$/g, measured using nitrogen and the BET method. The cPCCs' surface area will typically be up to 200.0 m$^2$/g, preferably up to 100.0 m$^2$/g and most preferably up to 50.0 m$^2$/g, measured using nitrogen and the BET method.

Accordingly, the cPCC preferably has a specific surface area of from 5.0 m$^2$/g to 200.0 m$^2$/g, more preferably from 10.0 m$^2$/g to 100.0 m$^2$/g and most preferably from 15.0 m$^2$/g to 50.0 m$^2$/g, measured using nitrogen and the BET method. For example, the cPCC has a specific surface area of from 15.0 m$^2$/g to 40.0 m$^2$/g, more preferably from 15.0 m$^2$/g to 30.0 m$^2$/g and most preferably from 20.0 m$^2$/g to 30.0 m$^2$/g, measured using nitrogen and the BET method.

As already outlined above, the cPCC designates a PCC product in the form of aggregates of individual PCC particles. Thus, it is appreciated that, if not otherwise indicated, the BET specific surface area of the cPCC refers to the aggregates' BET surface area.

It is further preferred that the cPCC aggregates have a large weight median particle diameter $d_{50}$ value.

In one embodiment of the present invention, the cPCC aggregates have a weight median particle diameter $d_{50}$ value from 0.1 to 50.0 μm, preferably from 0.2 to 25.0 μm, more preferably from 0.3 to 10.0 μm and most preferably from 0.4 to 5.0 μm, measured according to the sedimentation method. For example, the cPCC aggregates have a weight median particle diameter $d_{50}$ value from 0.5 to 5.0 μm, preferably from 0.5 to 4.0 μm and most preferably from 0.5 to 3.0 μm, measured according to the sedimentation method.

The cPCC aggregates consist of a greater or smaller number of single crystals. Preferably, the cPCC aggregates consist of single crystals having a weight median particle diameter $d_{50}$ value from 0.01 to 5.0 μm, preferably from 0.02 to 2.5 μm, more preferably from 0.03 to 1.0 μm and most preferably from 0.04 to 0.5 μm, measured according to the sedimentation method.

As used herein and as generally defined in the art, the "$d_{50}$" value is determined based on measurements made by using a Sedigraph™ 5100 of Micromeritics Instrument Corporation (operating instrument software version 1.04) and is defined as the size at which 50% (the median point) of the particle volume or mass is accounted for by particles having a diameter equal to the specified value. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

It is appreciated that the amount of calcium carbonate in the cPCC is at least 80.0 wt.-%, e.g. at least 95.0 wt.-%, preferably from 97.0 to 100.0 wt.-% and most preferably from 98.5 and 99.95 wt.-%, based on the total dry weight of the cPCC.

Additionally or alternatively, the cPCC has an electrophoretic mobility in 0.1 M NaCl of $\geq+0.1\times10^{-8}$ $m^2V^{-1}s^{-1}$, preferably $\geq+0.3\times10^{-8}$ $m^2V^{-1}$ $s^{-1}$, more preferably $\geq+0.5\times10^{-8}$ $m^2V^{-1}s^{-1}$ and most preferably from +0.5 to $+1.5\times10^{-8}$ $m^2V^{-1}$ $s^{-1}$. As measured by electrophoretic light scattering. It is appreciated that the electrophoretic mobility described in this paragraph applies only to the undispersed cPCC. Furthermore, it is appreciated that the electrophoretic mobility described in this paragraph does also not apply to the surface-treated cPCC as described below.

In one embodiment of the present invention, the cPCC is used in the form of a powder.

The term "powder" as used herein, encompasses solid cPCC of at least 90.0 wt.-%, preferably of at least 95.0 wt.-% and most preferably of at least 98.0 wt.-%, e.g. from 98.0 to 99.8 wt.-%, based on the total weight of the powder, wherein the powder particles have a specific surface area of at least 5.0 $m^2/g$, measured using nitrogen and the BET method.

Alternatively, the cPCC is used in the form of an aqueous suspension comprising the cPCC.

An "aqueous suspension" or "slurry" in the meaning of the present invention is a suspension comprising insoluble solids and water and optionally further additives. Suspensions or slurries usually contain large amounts of solid and are more viscous and generally of higher density than the liquid from which they are formed.

If the cPCC is used in the form of an aqueous suspension, the cPCC to be used in the present invention is prepared as an aqueous suspension having a pH measured at 20° C. (±1° C.), of $\geq 6.0$, preferably $\geq 6.5$, more preferably $\geq 7.0$ and most preferably $\geq 7.5$.

The aqueous suspension preferably comprises the cPCC in an amount from 0.1 to 90.0 wt.-%, based on the total weight of the aqueous suspension.

In one embodiment of the present invention, the aqueous suspension comprises the cPCC in an amount of from 0.1 to 80.0 wt.-% and preferably from 3.0 to 60.0 wt.-%, based on the total weight of the aqueous suspension. For example, the aqueous suspension preferably has a content of the cPCC ranging from 5.0 to 40.0 wt.-%, based on the total weight of the aqueous suspension.

The cPCC of the present invention can be surface-treated with at least one aliphatic carboxylic acid having a total amount of carbon atoms from C4 to C24.

The aliphatic carboxylic acid in the meaning of the present invention may be selected from one or more straight chain, branched chain, saturated, unsaturated and/or alicyclic carboxylic acids having a total amount of carbon atoms from C4 to C24. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the cPCC is surface-treated with at least one aliphatic carboxylic acid selected from saturated unbranched carboxylic acids. That is to say, the cPCC is preferably surface-treated with at least one aliphatic carboxylic acid selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

For example, the cPCC is surface-treated with at least one aliphatic carboxylic acid selected from the group consisting of octanoic acid, decanoic acid, lauric acid, myristic acid, palmitic acid, stearic acid, arachidic acid and mixtures thereof. Preferably, the cPCC is surface-treated with at least one aliphatic carboxylic acid selected from the group consisting of myristic acid, palmitic acid, stearic acid and mixtures thereof.

In one embodiment of the present invention, the cPCC is surface-treated with stearic acid as aliphatic carboxylic acid.

Additionally or alternatively, the cPCC can be stabilised by one or more dispersant.

The expression "one or more" dispersants means that one or more kinds of dispersants may be used to stabilise the cPCC.

Accordingly, the one or more dispersants may be one kind of a dispersant. Alternatively, the one or more dispersants may be a mixture of two or more kinds of dispersants. For example, the one or more dispersants may be a mixture of two or three kinds of dispersants. Preferably, the one or more dispersant is one kind of a dispersant.

Conventional dispersants known to the skilled person can be used. That is to say, the cPCC can be stabilised by one or more cationic and/or anionic dispersants. For example, the cPCC can be stabilised by one or more cationic and/or anionic dispersants selected from the group comprising cationic starch, polyDADMAC, polyamine, polyacrylamide, polyethyleneimine, polyacrylate and mixtures thereof.

A preferred dispersant is polyacrylic acid.

In one embodiment of the present invention, the cPCC is surface-treated with at least one aliphatic carboxylic acid having a total amount of carbon atoms from C4 to C24, preferably stearic acid, and stabilized with one or more dispersants, preferably one or more cationic and/or anionic dispersants. Alternatively, the cPCC is surface-treated with at least one aliphatic carboxylic acid having a total amount of carbon atoms from C4 to C24, preferably stearic acid, or stabilized with one or more dispersants, preferably one or more cationic and/or anionic dispersants.

The cPCC can, if desired, be used alone, i.e. as sole adsorbing aid, or in combination with at least one further adsorbing material.

The expression "at least one" further adsorbing material means that one or more kinds of further adsorbing material may be added to the aqueous medium in combination with the cPCC.

Accordingly, it is appreciated that the at least one further adsorbing material is one kind of a further adsorbing material. Alternatively, the at least one further adsorbing material is a mixture of two or more kinds of further adsorbing materials. For example, the at least one further adsorbing material is one kind of a further adsorbing material.

The at least one further adsorbing material can be selected among non-cPCC and other types of adsorbing materials.

In this regard, it is to be noted that cPCC can also occur as aggregates having a specific surface area of less than 5.0 $m^2/g$, but as mentioned above the expression "cPCC" in the context of the present invention is to be understood as PCC having a specific surface area of at least 5.0 $m^2/g$, measured using nitrogen and the BET method. However, "non-cPCC" or "non-colloidal PCC" is defined as PCC not forming aggregates of individual PCC particles. The non-cPCC preferably has a specific surface area of less than 15.0 $m^2/g$ and preferably of less than 10.0 $m^2/g$, measured using nitrogen and the BET method. For example, the non-cPCC has a specific surface area of from 0.1 to 15.0 m$^2$/g and preferably of from 0.1 to 10.0 m$^2$/g, measured using nitrogen and the BET method.

There is a wide variety of types of non-cPCC with different mineralogical crystal forms which are suitable as further adsorbing material, e.g. non-cPCC comprising scalenohedral, rhombohedral, aragonitic, vateritic or calcitic mineralogical crystal forms or mixtures thereof.

Other types of adsorbing materials which are suitable as the at least one further adsorbing material can be selected from the group comprising talc, kaolin, calcined kaolin, natural calcium carbonate selected from marble, chalk, calcite, limestone and dolomite, gypsum, silicate-containing minerals, hydroxide-containing minerals, calcium sulfoaluminates, plastic particles, organic pigments, surface-reacted calcium carbonate, hydrophobised GCC, hydrophobised PCC and mixtures thereof.

In one embodiment of the present invention, cPCC is used in combination with talc as the at least one further adsorbing material.

Talcs which are useful in the present invention are any commercially available talcs, such as, e.g. talcs from Sotkamo (Finland), Three Springs (Australia), Haicheng (China), from the Alpes (Germany), Florence (Italy), Tyrol (Austria), Shetland (Scotland), Transvaal (South Africa), the Appalachians, California, Vermont and Texas (USA).

Depending on the origin of the coarse talc, there may be several impurities contained therein such as chlorite, dolomite and magnesite, amphibole, biotite, olivine, pyroxene, quartz and serpentine.

Preferred for the use in the present invention are talcs having a content of pure talc of >90.0 wt.-%, for example >95.0 wt.-% or >97.0 wt.-% and up to >100 wt.-%, based on the total weight of talc.

The talc particles used in the present invention may have a weight median particle diameter d$_{50}$, measured according to the sedimentation method, in the range of from 0.1 to 50.0 µm, preferably from 0.2 to 40.0 µm, more preferably from 0.3 to 30.0 µm, even more preferably from 0.4 to 20.0 µm, and most preferably from 0.5 to 10.0 µm. For example, the talc particles have a weight median particle diameter d$_{50}$, measured according to the sedimentation method, in the range of from 0.5 to 7.0 µm, preferably from 0.5 to 4.0 µm and most preferably from 0.5 to 1.0 µm.

The specific surface area of the talc can be between 3.0 and 100.0 m$^2$/g, preferably between 7.0 m$^2$/g and 80.0 m$^2$/g more preferably between 9.0 m$^2$/g and 60.0 m$^2$/g, even more preferably between 9.0 and 51.0 m$^2$/g, still more preferably between 10.0 and 50.0 m$^2$/g, and most preferably between 10.0 and 30.0 m$^2$/g, measured using nitrogen and the BET.

In one embodiment of the present invention, cPCC is used in combination with surface-reacted calcium carbonate as the at least one further adsorbing material.

A "surface-reacted calcium carbonate" (SRCC) is a material comprising calcium carbonate and an insoluble, at least partially crystalline, non-carbonate calcium salt extending from the surface of at least part of the calcium carbonate. The calcium ions forming said at least partially crystalline non-carbonate calcium salt originate largely from the starting calcium carbonate material that also serves to form the surface-reacted calcium carbonate core.

Preferably, the surface-reacted calcium carbonate is obtained by reacting a natural calcium carbonate with an acid and with carbon dioxide, wherein the carbon dioxide is formed in situ by the acid treatment and/or is supplied from an external source. Preferably, the natural calcium carbonate is selected from the group comprising marble, chalk, calcite, dolomite, limestone and mixtures thereof.

The surface-reacted calcium carbonate can be in form of a suspension, optionally further stabilised by a dispersant. Conventional dispersants known to the skilled person can be used. A preferred dispersant is polyacrylic acid.

If the surface-reacted calcium carbonate is in form of a suspension, the aqueous suspension comprising the surface-reacted calcium carbonate has a pH greater than 6.0, preferably greater than 6.5, more preferably greater than 7.0 and most preferably 7.5, measured at 20° C.

Alternatively, the surface-reacted calcium carbonate can be in the form of granules or a powder.

In a preferred embodiment, the surface-reacted calcium carbonate has a specific surface area of from 5.0 m$^2$/g to 200.0 m$^2$/g, more preferably 20.0 m$^2$/g to 80.0 m$^2$/g and even more preferably 30.0 m$^2$/g to 60.0 m$^2$/g, e.g. 43.0 m$^2$/g, measured using nitrogen and the BET method according to ISO 9277.

Furthermore, it is preferred that the surface-reacted calcium carbonate has a weight median particle diameter d$_{50}$ of from 0.1 to 50.0 µm, more preferably from 0.5 to 25.0 µm, even more preferably 0.8 to 20.0 µm, particularly 1.0 to 10.0 µm, e.g. 4 to 7 µm measured according to the sedimentation method.

In one embodiment, the surface-reacted calcium carbonate has a specific surface area within the range of 15.0 to 200.0 m$^2$/g and a weight median particle diameter d$_{50}$ within the range of 0.1 to 50.0 µm. More preferably, the specific surface area is within the range of 20.0 to 80.0 m$^2$/g and the weight median particle diameter d$_{50}$ is within the range of 0.5 to 25.0 µm. Even more preferably, the specific surface area is within the range of 30.0 to 60.0 m$^2$/g and the weight median particle diameter d$_{50}$ is within the range of 0.7 to 7.0 µm.

Further details about the surface-reacted calcium carbonate and the preparation of the surface-reacted calcium carbonate are disclosed in WO 2008/113838 A1 and WO 2008/113839 A1, where it is described for the removal of endocrine disrupting compounds and the control of pitch, the content of these references herewith being included in the present application.

In one embodiment of the present invention, cPCC is used in combination with hydrophobised GCC and/or hydrophobised PCC as the at least one further adsorbing material.

The term "hydrophobised" ground calcium carbonate and/or "hydrophobised" precipitated calcium carbonate in the meaning of the present invention refers to a ground calcium carbonate and/or hydrophobised precipitated calcium carbonate that has been processed through an additional treatment step with an hydrophobising agent in order to render the surface of the calcium carbonate particles more hydrophobic.

It is preferred that the ground calcium carbonate particles and/or the precipitated calcium carbonate particles of the hydrophobised GCC and/or hydrophobised PCC have a weight median particle diameter d$_{50}$ value of from 0.1 to 50.0 µm, preferably from 0.1 to 25.0 µm, more preferably from 0.1 to 15.0 µm and most preferably from 0.5 to 5.0 µm, measured according to the sedimentation method. For example, the ground calcium carbonate particles and/or the precipitated calcium carbonate particles have a weight median particle diameter d$_{50}$ value of 1.5 µm.

The ground calcium carbonate particles and/or the precipitated calcium carbonate particles preferably have a specific surface area of from 0.5 m$^2$/g to 25.0 m$^2$/g, preferably 0.5 m$^2$/g to 15.0 m$^2$/g and more preferably 1 m$^2$/g to 11.0 m²/g, measured using nitrogen and the BET method. For example, the ground calcium carbonate particles and/or the precipitated calcium carbonate particles have a specific surface area of from 3.5 m²/g to 4.0 m²/g.

The ground calcium carbonate particles and/or the precipitated calcium carbonate particles are preferably treated with a hydrophobising agent selected from an aliphatic carboxylic acid having between 5 and 24 carbon atoms.

In one embodiment, the hydrophobising agent is selected from saturated unbranched carboxylic acids, that is to say the hydrophobising agent is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In a preferred embodiment, the hydrophobising agent is selected from the group consisting of octanoic acid, decanoic acid, lauric acid, myristic acid, palmitic acid, stearic acid, arachidic acid and mixtures thereof. Preferably, the hydrophobising agent is selected from the group consisting of myristic acid, palmitic acid, stearic acid and mixtures thereof.

In an especially preferred embodiment, the hydrophobising agent is stearic acid.

Further details about the hydrophobised GCC and/or hydrophobised PCC are disclosed in WO 2013/007717 A1, where they are described for the reduction of pitch in an aqueous medium generated in a papermaking or pulping process, the content of this reference herewith being included in the present application.

The at least one further adsorbing material, preferably talc, surface-reacted calcium carbonate, hydrophobised GCC, hydrophobised PCC and mixtures thereof, can be used in powder form. As an alternative, it can be kept in suspension, optionally further stabilised by a dispersant. Conventional dispersants known to the skilled person can be used. The dispersant can be anionic or cationic.

Preferably, the cPCC and the at least one further adsorbing material, preferably talc, MCC, hydrophobised GCC, hydrophobised PCC and mixtures thereof, are mixed, preferably in powder form, before being brought into contact with the at least one organic material containing aqueous medium to be treated. Blending can be accomplished by any conventional means known to the skilled person.

Alternatively, the cPCC and the at least one further adsorbing material, preferably talc, MCC, hydrophobised GCC, hydrophobised PCC and mixtures thereof, can be added to the at least one organic material containing aqueous medium in separate steps.

For example, the amount of the at least one further adsorbing material, preferably talc, MCC, hydrophobised GCC, hydrophobised PCC and mixtures thereof, is ≤25.0 wt.-%, preferably ≤10.0 wt.-%, more preferably ≤5.0 wt.-% and most preferably ≤2.0 wt.-%, based on the total dry weight of cPCC and the at least one further adsorbing material.

If the cPCC is used in combination with at least one further adsorbing material, the amount of the at least one further adsorbing material is preferably from 0.1 to 25.0 wt.-%, more preferably from 0.1 to 10.0 wt.-%, even more preferably from 0.5 to 5.0 wt.-% and most preferably from 0.5 to 2.0 wt.-%, based on the total dry weight of cPCC and the at least one further adsorbing material.

It is appreciated that the aqueous medium obtained after using the cPCC for adsorbing and/or reducing the amount of at least one organic material can be further implemented in a papermaking process. In this context, it is to be noted that filler materials, preferably non-cPCC or GCC, can be added to the obtained aqueous medium to be implemented in a papermaking process in order to improve optical and/or mechanical properties of the final paper product and which do not contribute to the adsorbing capability of the cPCC. Thus, the filler materials which are added in a subsequent papermaking process are not considered as further adsorbing material in the meaning of the present invention.

Furthermore, it has surprisingly been found out that the cPCC of the present invention is advantageously used for adsorbing and/or reducing the amount of at least one organic material in an aqueous medium.

An aqueous medium comprising at least one organic material is preferably understood to be an aqueous medium generated in a papermaking or pulping process. In one embodiment of the present invention, the aqueous medium comprising at least one organic material is selected from bleached and unbleached pulp. For example, the bleached and unbleached pulp is selected from the group comprising mechanical pulp, ground pulp, thermomechanical pulp (TMP), chemothermomechanical pulp (CTMP), kraft pulp, sulfate pulp, recycled pulp and mixtures thereof.

"Bleached pulp" in the meaning of the present invention refers to pulp being treated for removal of coloured residual lignin to increase the brightness and to improve the colour of the pulp.

"Unbleached pulp" in the meaning of the present invention refers to pulp which has not been bleached.

"Mechanical pulp" in the meaning of the present invention is prepared by comminuting logs and chips of pulpwood into the respective fibre components by using mechanical energy. Pitch containing pulp which can be subjected to the process of the present invention particularly comes from wood pulp, which is the most common material used to make paper materials.

"Ground pulp", as used herein, generally comes from softwood trees such as spruce, pine, fir, larch and hemlock, but also some hardwoods such as *eucalyptus* and is produced by grinding wood into relatively short fibres with stone grinding.

"Thermomechanical pulp", as used herein, is produced in a thermo-mechanical process wherein wood chips or saw dust are softened by steam before entering a pressurized refiner.

"Chemithermomechanical pulp", as used herein, is produced by treating wood chips with chemicals such as sodium sulfite and steam and subsequent mechanical treatment.

"Sulfate pulp" or "kraft pulp" are two types of chemical pulping wherein Kraft is the predominant pulping process in chemical pulp production. "Chemical pulp" is generally produced by treating wood chips or saw dust with chemicals to liberate the cellulose fibres by removing binding agents such as lignin resins and gums.

"Recycled pulp", as used herein, is derived from recycled paper and paperboard or wastepaper.

The at least one organic material, which can be adsorbed and/or reduced according to the present invention, can be described as at least one dissolved and/or colloidal material generated in a papermaking or pulping or paper recycling process. In this regard, it is to be noted that the at least one organic material is typically considered as a contaminant in the papermaking or pulping or paper recycling process as it may have a negative impact on the output and on the quality of a final paper product prepared therefrom.

The expression "at least one" organic material means that one or more kinds of organic materials may be present in the aqueous medium.

Accordingly, it is appreciated that the at least one organic material is one kind of organic material. Alternatively, the at least one organic material is a mixture of two or more kinds of organic materials. For example, the at least one organic material comprises a plurality of organic materials.

The at least one dissolved and/or colloidal material, i.e. the at least one organic material, is preferably originated from wood and/or wood resins. Preferably, the at least one dissolved and/or colloidal material that is originated from wood and/or wood resins is selected from the group comprising polysaccharides, such as hemicelluloses, lignin, starch and pectins, resin acids, fats, fatty acids, fatty alcohols, terpenes, terpenoids, polyisoprenes, sterols, steryl esters, waxes and mixtures thereof. However, it is to be noted that the chemical composition of the aqueous medium depends on the fibre source, such as variety of tree, and on the seasonal growth from which the sample is generated.

With respect to recycled pulp, it should be noted that the term at least one dissolved and/or colloidal material is/are also used to describe organic materials originated from paper coatings, coating binders, printing inks, de-inking chemicals, hot melts and/or adhesives. These dissolved and/or colloidal substances comprise a variety of different materials such as styrene-butadiene binders, latex in general, rubber, vinyl acrylates, polyisoprene, polybutadiene and the like.

Additionally or alternatively, the at least one organic material to be adsorbed and/or reduced in the aqueous medium can be at least one endocrine disrupting compound (EDC), which may be present in e.g. urban waste water, industrial waste water, drinking water, agricultural waste water or waste water from breweries or other beverage industries.

There is an increasing concern about the ubiquity of EDCs of whatever origin in the environment. Indeed, the information regarding a possible role of these compounds in a number of negative health trends in wildlife and man continues to grow, including the hormonal imbalance (feminization) and altered reproductive success in wildlife such as in fish and avian; and the increased incidence of breast, testicular and prostate cancer as well as immunological and neurological dysfunctions in humans. These events may occur at relative low, environmentally relevant concentrations of 0.1-20 ngdm$^{-3}$. Thanks to the continuously decreasing detection limit of EDCs, a better understanding about the availability and effect of these compounds in the environment is possible.

The EDCs, which can be adsorbed and/or which amount can be reduced in the aqueous medium by using the cPCC are selected from the group comprising, e.g. endogenous hormones such as 17β-estradiol (E2), estrone (E1), estriol (E3), testosterone or dihydro testosterone; phyto and myco hormones such as β-sitosterol, genistein, daidzein or zeraleon; drugs such as 17α-ethinylestradiol (EE2), mestranol (ME), diethylstilbestrol (DES), and industrial chemicals such as 4-nonyl phenol (NP), 4-tert-octyl phenol (OP), bisphenol A (BPA), tributyltin (TBT), methylmercury, phthalates, PAK or PCB.

In a preferred embodiment, the at least one organic material, i.e. the at least one dissolved and/or colloidal material, in the aqueous medium is non-ionic and/or anionic.

The total amount of such at least one organic material in the aqueous medium prior to the addition of the cPCC, evaluated based on the Chemical Oxygen Demand (COD), is preferably from 20 to 10 000 mg $O_2/dm^3$, as measured according to the measurement method provided in the Examples section herebelow.

The pH of the aqueous medium prior to the addition of the cPCC is preferably greater than 6, more preferably greater than 7.

The cPCC can be brought into contact with the at least one organic material containing aqueous medium by any conventional means known to the skilled person.

The cPCC and the optional further adsorbing material can be added to the aqueous medium in powder form or in the form of an aqueous suspension as described above. Within the context of the present invention, it is also possible to provide an immobile phase, e.g. in the form of a cake or layer, comprising the cPCC and the optional further adsorbing material, such that the aqueous medium runs through said immobile phase. In an alternative embodiment, the aqueous medium to be purified is passed through a permeable filter comprising the cPCC and the optional further adsorbing material, and being capable of retaining, via size exclusion, the at least one organic material on the filter surface as the liquid is passed through by gravity and/or under vacuum and/or under pressure. This process is called "surface filtration".

In another technique known as depth filtration, a filtering aid comprising of a number of tortuous passages of varying diameter and configuration retains the at least one organic material by molecular and/or electrical forces adsorbing the at least one organic material onto the cPCC and the optional further adsorbing material which is present within said passages, and/or by size exclusion, retaining the organic material particles if they are too large to pass through the entire filter layer thickness.

Preferably, the cPCC and the optional further adsorbing material is added to the at least one organic material-containing aqueous medium, e.g. by agitation means. The amount of cPCC depends on the type of the at least one organic material to be adsorbed and/or reduced. Preferably, the cPCC is added to the aqueous medium in an amount from 0.05 to 90.0 wt.-%, preferably from 0.1 to 50.0 wt.-%, more preferably from 0.25 to 25.0 wt.-%, even more preferably from 0.5 to 10.0 wt.-% and most preferably from 0.5 to 5.0 wt.-%, based on the total weight of oven dry (100° C.) fibers in the aqueous medium.

If at least one EDC is to be removed from the aqueous medium, the cPCC is preferably added to the aqueous medium in dosages (weight-based) of from $10^2$ to $10^9$ times the mass of EDCs, preferably from $2\times10^4$ to $10^6$ and most preferably from $10^4$ to $3\times10^5$.

If the cPCC is used in combination with a further adsorbing material, the cPCC and the further adsorbing material are added to the aqueous medium in a total amount from 0.05 to 90.0 wt.-%, preferably from 0.1 to 50.0 wt.-%, more preferably from 0.25 to 25.0 wt.-%, even more preferably from 0.5 to 10.0 wt.-% and most preferably from 0.5 to 5.0 wt.-%, based on the total weight of oven dry (100° C.) fibers in the aqueous medium.

If at least one EDC is to be removed from the aqueous medium, the cPCC and the further adsorbing material are preferably added to the aqueous medium in dosages (weight-based) of from $10^2$ to $10^9$ times the mass of EDCs, preferably from $2\times10^4$ to $10^6$ and most preferably from $10^4$ to $3\times10^5$.

After the adsorption and/or reduction of the amount of the at least one organic material is completed, the composites formed of cPCC, organic material and optional further materials can be separated from the aqueous medium by conventional separation means known to the skilled person such as sedimentation, centrifugation and filtration. Preferably, the formed composites are separated from the aqueous medium by filtration.

The aqueous medium obtained after the addition of the cPCC to the aqueous medium, and the subsequent separation of the composites formed of cPCC, organic material and optional further materials from the aqueous medium, contains an amount of the at least one organic material that is lower than the amount of the at least one organic material contained in a corresponding aqueous medium obtained by the same process but without using the cPCC.

The wording "without using the cPCC" as used herein refers to the use of an alternative adsorbing material being free of cPCC. It is to be noted that the term "free" reflects the amount of cPCC being added to the aqueous medium and is preferably well below 0.05 wt.-%, based on the total weight of adsorbing material added to the aqueous medium.

It is also appreciated that the amount of the at least one organic material is reduced after the addition of the cPCC to the aqueous medium, and the subsequent separation of the composites formed of cPCC, compared to the initial amount of the at least one organic material in the aqueous medium, i.e. before the addition of the cPCC to the aqueous medium.

Thus, it is preferred that after the addition of the cPCC to the aqueous medium, and the subsequent separation of the composites formed of cPCC, organic material and optional further materials from the aqueous medium, the turbidity of the aqueous medium is reduced compared to the turbidity of an aqueous medium without the use of the cPCC.

Preferably, the reduction in turbidity by adding the cPCC to the aqueous medium can be expressed in that the aqueous medium, after the addition of the cPCC in an amount of at least 10 g/L, preferably 10 g/L, aqueous medium, has a turbidity being at least 20.0%, preferably at least 40.0%, more preferably at least 50.0%, even more preferably at least 75.0% and most preferably at least 90.0% below the initial turbidity, i.e. the turbidity (NTU) of the aqueous medium before the addition of the cPCC.

In one embodiment of the present invention, the reduction in turbidity by adding the cPCC to the aqueous medium can be expressed in that the aqueous medium, after the addition of the cPCC in an amount of at least 15 g/L, preferably 15 g/L, aqueous medium, has a turbidity being at least 75.0%, preferably at least 85.0%, more preferably at least 90.0% and most preferably at least 95.0% below the initial turbidity, i.e. the turbidity (NTU) of the aqueous medium before the addition of the cPCC. For example, the reduction in turbidity by adding the cPCC to the aqueous medium can be expressed in that the aqueous medium, after the addition of the cPCC in an amount of at least 20 g/L, preferably from 20 to 60 g/L, aqueous medium, has a turbidity being at least 80.0%, preferably at least 90.0%, more preferably at least 95.0% and most preferably at least 98.0% below the initial turbidity, i.e. the turbidity (NTU) of the aqueous medium before the addition of the cPCC.

It is preferred that the adsorption and/or reduction of the amount of the at least one organic material in the aqueous medium is accomplished when the aqueous medium has a turbidity ratio (turbidity$_{before}$/turbidity$_{after}$) of ≥2, preferably ≥5, more preferably ≥10, even more preferably ≥25, still more preferably ≥50 and most preferably ≥100 wherein (turbidity$_{before}$) is the turbidity (NTU) of the aqueous medium before the addition of the cPCC, (turbidity$_{after}$) is the turbidity (NTU) of the aqueous medium after the addition of the cPCC in an amount of at least 10 g/L aqueous medium.

Additionally or alternatively, after the addition of the cPCC to the aqueous medium, and the subsequent separation of the composites formed of cPCC, organic material and optional further materials from the aqueous medium, the chemical oxygen demand (COD) of the aqueous medium is reduced compared to the COD of an aqueous medium without the use of the cPCC.

Preferably, the reduction in COD by adding the cPCC to the aqueous medium can be expressed in that the aqueous medium, after the addition of the cPCC in an amount of at least 10 g/L, preferably 10 g/L, aqueous medium, has a chemical oxygen demand (COD) being at least 1.0%, preferably at least 5.0%, more preferably at least 10.0%, even more preferably at least 15.0%, still more preferably at least 20% and most preferably at least 50.0% below the initial COD, i.e. the COD (mg/L) of the aqueous medium before the addition of the cPCC.

In one embodiment of the present invention, the reduction in COD by adding the cPCC to the aqueous medium can be expressed in that the aqueous medium, after the addition of the cPCC in an amount of at least 20 g/L, preferably 20 g/L, aqueous medium, has a chemical oxygen demand (COD) being at least 10.0%, preferably at least 12.0%, more preferably at least 15.0% and most preferably at least 20.0% below the initial COD, i.e. the COD (mg/L) of the aqueous medium before the addition of the cPCC.

It is preferred that the adsorption and/or reduction of the amount of the at least one organic material in the aqueous medium is accomplished when the aqueous medium has a COD ratio (COD$_{before}$/COD$_{after}$) of ≥1.01, preferably ≥1.1, more preferably ≥1.2 and most preferably from 1.2 to 1.5 wherein (COD$_{before}$) is the COD (mg/L) of the aqueous medium before the addition of the cPCC, (COD$_{after}$) is the COD (mg/L) of the aqueous medium after the addition of the cPCC in an amount of at least 10 g/L aqueous medium.

Additionally or alternatively, after the addition of the cPCC to the aqueous medium, and the subsequent separation of the composites formed of cPCC, organic material and optional further materials from the aqueous medium, the electrochemical charge (SCD) of the aqueous medium is increased compared to the electrochemical charge of an aqueous medium without the use of the cPCC.

With regard to the wording "electrochemical charge is increased" it is to be noted that it refers to a reduction of anionic charge in the aqueous medium by using the cPCC.

Preferably, the increase of the electrochemical charge by adding the cPCC to the aqueous medium can be expressed in that the aqueous medium, after the addition of the cPCC in an amount of at least 10 g/L, preferably 10 g/L, aqueous medium, has an electrochemical charge (SCD) being at least 5%, preferably at least 15.0%, more preferably at least 20.0%, even more preferably at least 25.0% and most preferably at least 50.0% above the initial electrochemical charge, i.e. the electrochemical charge (μEq/g) of the aqueous medium before the addition of the cPCC.

In one embodiment of the present invention, the increase of the electrochemical charge by adding the cPCC to the aqueous medium can be expressed in that the aqueous medium, after the addition of the cPCC in an amount of at least 50 g/L, preferably 50 g/L, aqueous medium, has an electrochemical charge (SCD) being at least 25.0%, preferably at least 50.0%, more preferably at least 60.0% and most preferably at least 70.0% above the initial electrochemical charge, i.e. the electrochemical charge (µEq/g) of the aqueous medium before the addition of the cPCC.

It is preferred that the adsorption and/or reduction of the amount of the at least one organic material in the aqueous medium is accomplished when the aqueous medium has a SCD ratio ($SCD_{before}/SCD_{after}$) of ≥1.2, preferably ≥1.3, more preferably ≥1.4 and most preferably from 1.4 to 8 wherein ($SCD_{before}$) is the SCD (µEq/g) of the aqueous medium before the addition of the cPCC, ($SCD_{after}$) is the SCD (µEq/g) of the aqueous medium after the addition of the cPCC in an amount of at least 10 g/L aqueous medium.

In one embodiment of the present invention, after the addition of the cPCC to the aqueous medium, and the subsequent separation of the composites formed of cPCC, organic material and optional further materials from the aqueous medium, the turbidity of the aqueous medium is reduced compared to the turbidity of an aqueous medium without the use of the cPCC, or the chemical oxygen demand (COD) of the aqueous medium is reduced compared to the COD of an aqueous medium without the use of the cPCC, or the electrochemical charge (SCD) of the aqueous medium is increased compared to the electrochemical charge of an aqueous medium without the use of the cPCC.

Accordingly, it is appreciated that the aqueous medium, after the addition of the cPCC in an amount of at least 10 g/L aqueous medium, has a turbidity being at least 20%, preferably at least 40.0%, more preferably at least 50.0%, even more preferably at least 75.0% and most preferably at least 90.0% below the initial turbidity, i.e. the turbidity (NTU) of the aqueous medium before the addition of the cPCC, or a chemical oxygen demand (COD) being at least 1.0%, preferably at least 5.0%, more preferably at least 10.0%, even more preferably at least 15.0%, still more preferably at least 20.0% and most preferably at least 50.0% below the initial COD, i.e. the COD (mg/L) of the aqueous medium before the addition of the cPCC, or an electrochemical charge (SCD) being at least 5%, preferably at least 15.0%, more preferably at least 20.0%, even more preferably at least 25.0% and most preferably at least 50.0% above the initial electrochemical charge, i.e. the electrochemical charge (µEq/g) of the aqueous medium before the addition of the cPCC.

Alternatively, after the addition of the cPCC to the aqueous medium, and the subsequent separation of the composites formed of cPCC, organic material and optional further materials from the aqueous medium, the turbidity of the aqueous medium is reduced compared to the turbidity of an aqueous medium without the use of the cPCC, and the chemical oxygen demand (COD) of the aqueous medium is reduced compared to the COD of an aqueous medium without the use of the cPCC, and the electrochemical charge (SCD) of the aqueous medium is increased compared to the electrochemical charge of an aqueous medium without the use of the cPCC.

Accordingly, it is appreciated that the aqueous medium, after the addition of the cPCC in an amount of at least 10 g/L aqueous medium, has a turbidity being at least 20%, preferably at least 40.0%, more preferably at least 50.0%, even more preferably at least 75.0% and most preferably at least 90.0% below the initial turbidity, i.e. the turbidity (NTU) of the aqueous medium before the addition of the cPCC, and a chemical oxygen demand (COD) being at least 1.0%, preferably at least 5.0%, more preferably at least 10.0%, even more preferably at least 15.0%, still more preferably at least 20.0% and most preferably at least 50.0% below the initial COD, i.e. the COD (mg/L) of the aqueous medium before the addition of the cPCC, and an electrochemical charge (SCD) being at least 5%, preferably at least 15.0%, more preferably at least 20.0%, even more preferably at least 25.0% and most preferably at least 50.0% above the initial electrochemical charge, i.e. the electrochemical charge (µEq/g) of the aqueous medium before the addition of the cPCC.

The following examples will illustrate the present invention, but are not intended to limit the invention in any way.

EXAMPLES

Measurement Methods

BET Specific Surface Area of a Material ($m^2/g$)

BET specific surface area values were determined using nitrogen and the BET method according to ISO 9277.

Particle Size Distribution (Mass % Particles with a Diameter<X) and Weight Median Grain Diameter ($d_{50}$) of Particulate Material Weight median grain diameter and grain diameter mass distribution of a particulate material were determined via the sedimentation method, i.e. an analysis of sedimentation behaviour in a gravimetric field. The measurement was made with a Sedigraph™ 5100.

The method and the instrument are known to the skilled person and are commonly used to determine grain size of fillers and pigments. The measurement is carried out in an aqueous solution of 0.1% by weight of $Na_4P_2O_7$. The samples were dispersed using a high speed stirrer and ultrasonic.

Suspension pH Measurement

The pH of a suspension was measured at 23° C. using a Mettler Toledo™ Seven Easy pH meter equipped with the corresponding Mettler Toledo™ pH expansion unit and a Mettler Toledo InLab® 730 Expert Pro pH electrode.

A three point calibration (according to the segment method) of the instrument is first made using commercially available buffer solutions having pH values of 4, 7 and 10 at 20° C. (from Aldrich™).

The reported pH values are the endpoint values detected by the instrument (the endpoint is when the measured signal differs by less than 0.1 mV from the average over the last 6 seconds).

Conductivity (mS/cm)

The conductivity was measured at 25° C. by using Mettler Toledo Seven Multi instrumentation equipped with the corresponding Mettler Toledo conductivity expansion unit and a Mettler Toledo InLab® 730 conductivity probe, directly following stirring the aqueous medium at 1 500 rpm using a pendraulik tooth disc stirrer.

The instrument is first calibrated in the relevant conductivity range using commercially available conductivity calibration solutions from Mettler Toledo. The influence of temperature on conductivity is automatically corrected by the linear correction mode.

Measured conductivities are reported for the reference temperature of 20° C. The reported conductivity values are the endpoint values detected by the instrument (the endpoint is when the measured conductivity differs by less than 0.4% from the average over the last 6 seconds).

Weight Solids (% by Weight) of a Material in Suspension

The weight of solids is determined by dividing the weight of the solid material by the total weight of the aqueous suspension.

The weight of the solid material is determined by weighing the solid material obtained by evaporating the aqueous phase of suspension and drying the obtained material to a constant weight Gravimetric Analysis of a Suspension (Mg/Dm$^3$)

For a gravimetric analysis, a 100 cm$^3$ sample of aqueous medium was placed into a pre-weighed aluminium beaker and dried in an oven (90° C., 24 h) to get a total amount of non-volatile residue in the aqueous medium, i.e. any organic and inorganic material.

Suspension Turbidity Analysis (NTU)

45 cm$^3$ samples were used to analyse turbidity caused by colloidal substances by means of a NOVASINA 155 Model NTM-S turbidity probe. The measurement was carried out on the aqueous liquid phase of the samples obtained by separating the solid substances from the liquid phase, e.g. by filtration. This instrument transmits light in the near infrared spectrum through an optical fibre probe where the emerging beam is scattered by small particles in suspension. Light scattered back at 180° is collected by parallel optical fibres in the probe and focused onto a photo-diode. The resulting signal is amplified and displayed directly in Nephelometric Turbidity Units (NTU), defined as the intensity of light at a specified wavelength scattered, attenuated or absorbed by suspended particles, at a method-specified angle from the path of the incident light, compared to a synthetic chemically prepared standard. Interference from ambient light is eliminated by the adoption of a modulated transmission signal, removing the need for light-tight sample handling systems.

Chemical Oxygen Demand (COD, mg O$_2$/dm$^3$)

2 cm$^3$ samples were used to make chemical oxygen demand (COD) analyses, which give a value for the total organic content in the aqueous medium. The measurement was carried out on the aqueous liquid phase of the samples obtained by separating the solid substances from the liquid phase, e.g. by filtration. The COD analysis expresses the quantity of oxygen necessary for the oxidation of organic materials into CO$_2$ and was measured using a Lange CSB LCK 014, range 1 000-10 000 mg dm$^{-3}$ with a LASA 1/plus cuvette.

Streaming Current Detector Equivalency (SCD, µEq/g)

SCD titration measures the total electrochemical charge of the dissolved and colloidal substances in suspension and was evaluated by using Mütek PDC-03 instrumentation.

Materials

TMP Sample

The TMP sample consisting of 70 wt.-%, based on the total weight of oven dry (100° C.) fibers in the sample, of spruce, the rest being composed of fir and a small part of pine, was collected from a Swiss paper mill directly after the screen and prior to the bleaching step. The TMP sample was collected at a temperature of 95° C. It had a consistency of 2.3% and a pH of 6.5. The sample was cooled overnight to room temperature (rt) and filtered through a 2 µm filter to remove all fines and fibers. Light microscopic evaluation after filtration did not reveal the presence of any fibers. The TMP filtrate had a pH of 7.0, conductivity of 1.27 mS/cm and a turbidity of 490 NTU. The electrolyte concentration and composition is shown in Table 1.

TABLE 1 electrolyte concentration and composition of the TMP sample

| | TMP filtrate |
|---|---|
| Na$^+$/mM | 12.74 ± 0.04 |
| K$^+$/mM | 1.81 ± 0.13 |
| Ca$^{2+}$/mM | 1.97 ± 0.07 |
| Mg$^{2+}$/mM | 0.37 ± 0.00 |
| Cl$^-$/mM | 1.02 ± 0.11 |
| NO$_2^-$/mM | <0.02 |
| Br$^-$/mM | 0.03 ± 0.01 |
| NO$_3^-$/mM | <0.02 |
| PO$_4^{3-}$/mM | 0.13 ± 0.02 |
| SO$_4^{2-}$/mM | 0.38 ± 0.06 |
| SCD/µEq/g | -1.55 ± 0.05 |

Figure 2:
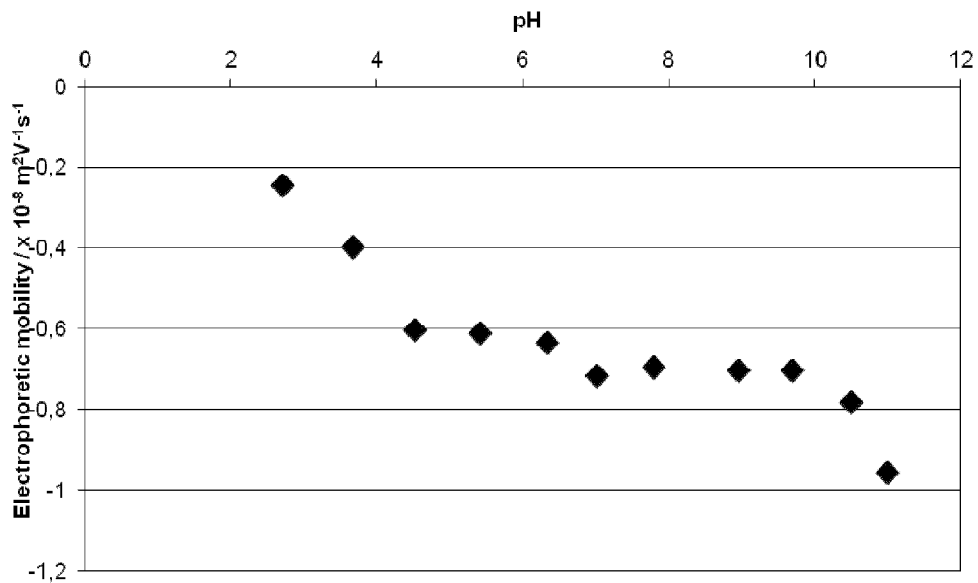
FIG. 2: Shows TMP filtrate was titrated versus pH and electrophoretic mobility was recorded.

The TMP filtrate was titrated versus pH and turbidity and electrophoretic mobility were recorded. The pH was first adjusted to a pH of 11 with 0.1 M NaOH solution and subsequently titrated with 0.1 M HCl solution to 2.7. It can be seen that the turbidity increased with decreasing pH (FIG. 1). The effect becomes less pronounced at alkaline pH. This is mainly related to the dissolution of resin and fatty acids. The electrophoretic mobility (EM) of the particles in the TMP filtrate (FIG. 2) was stable in the relevant pH region of 7-9. It is, however, important to note that below pH 4 the electrophoretic mobility substantially increased towards 0 (pzc) indicating a lower stability of the particles as a result of protonation of the acid anions of the resins and fatty acids forming protonised charge carriers. The point of zero charge (pzc) is around 2. Above a pH 10 the EM strongly decreased, pointing towards complete saponification of the triglycerides as well as of the resin and fatty acids.

Adsorbing Materials

A scalenohedral PCC, a colloidal PCC and talc (Finntalc P05 of Mondo Minerals, Netherlands) were tested as adsorbing materials. Their properties are listed in Table 2.

TABLE 2

Properties of the adsorbing materials

| | sPCC | cPCC | Talc |
|---|---|---|---|
| Sedigraph ® | | | |
| <2 µm/% | 82 | 89 | 41 |
| <1 µm/% | 31 | 55 | |
| d$_{50}$/µm | 1.36 | 0.92 | |
| Mastersizer | | | |
| <2 µm/% | 35 | 34 | 8 |
| <1 µm/% | 9 | 7 | 2 |
| d$_{50}$/µm | 2.58 | 2.51 | 6.30 |
| Specific surface area/m$^2$/g | 10 | 24 | 8 |
| Electrophoretic mobility in 0.1M NaCl/×10$^{-8}$ m$^2$/Vs | -0.2 | 0.9 | -3.8 |
| TGA Loss (200-1 000° C.)/% | 44.0 | 43.7 | 5.4 |

TMP/Adsorbing Material Sample Preparation

After the above described filtration, the TMP filtrate was placed in plastic bottles and the corresponding adsorbing material was dosed in chemical free slurry form. The adsorbing material dosages were chosen to be between 1 and 50 g/L TMP filtrate. The added water from the adsorbing material slurries was leveled by additional water for the low mineral containing samples in order to have the same dilution throughout the trial series. The bottles were well mixed by shaking and then agitated for 2 hours with closed lid. Afterwards, the suspensions were centrifuged with 2580 rpm. The solid and liquid phases were separated and the upper liquid phase was analyzed for turbidity, COD, gravimetry, pH, conductivity, SCD and ions ($Ca^{2+}$, $Mg^{2+}$, $Cl^-$, $SO_4^{2-}$).

Results

Figure 3:
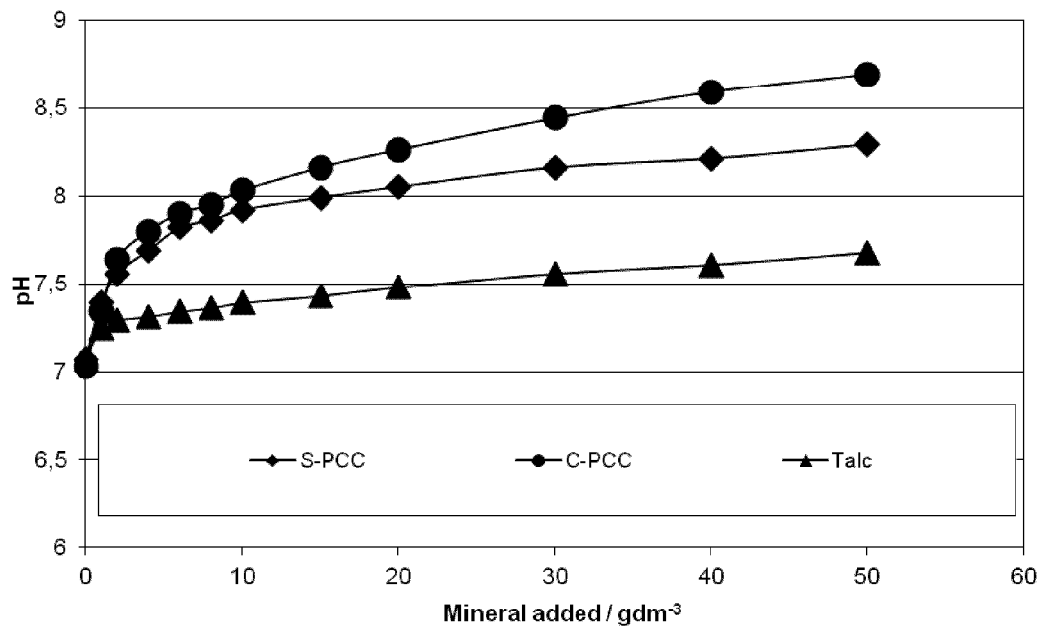
FIG. 3: Shows TMP/Adsorbing Material Sample pH—talc had the lowest impact on pH. The pH increased from 7 to 7.7. The pH increased strongly for cPCC and sPCC. cPCC showed the strongest increase up to 8.7.

As can be gathered from FIG. 3, talc had the lowest impact on pH. The pH increased from 7 to 7.7. The pH increased strongly for cPCC and sPCC. CPCC showed the strongest increase up to 8.7.

Figure 4:
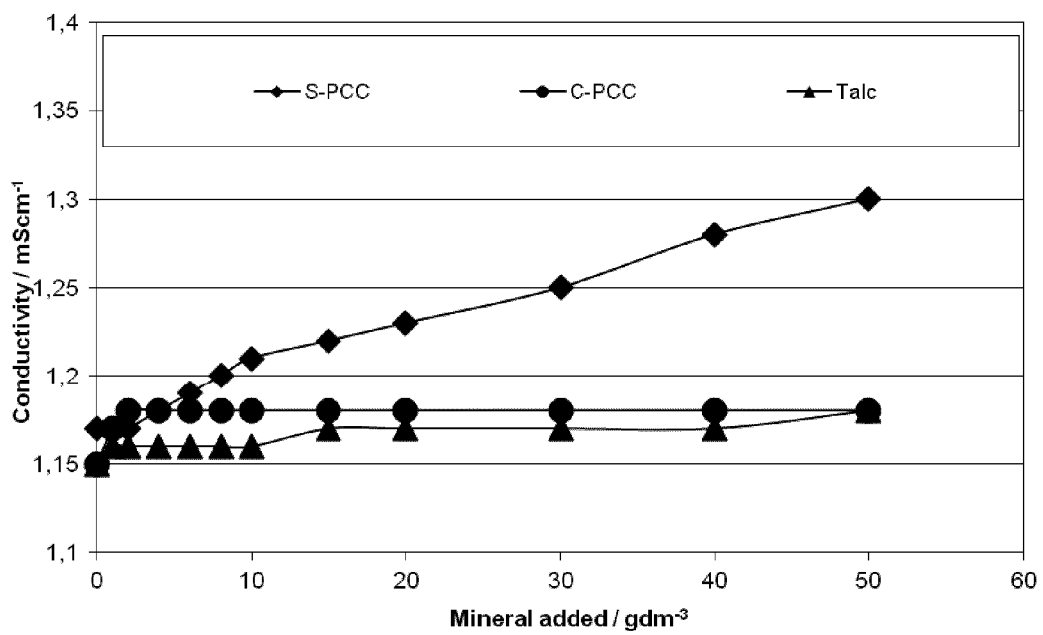
FIG. 4: Shows TMP/Adsorbing Material Sample conductivity—cPCC showed a rather low increase of conductivity (FIG. 4), which is comparable to the conductivity measured for talc. SPCC showed the strongest increase in conductivity of the three minerals.

In contrast thereto, the cPCC showed a rather low increase of conductivity (FIG. 4), which is comparable to the conductivity measured for talc. SPCC showed the strongest increase in conductivity of the three minerals.

Furthermore, it is to be noted that the calcium and magnesium ion concentrations were mostly affected by the corresponding adsorbing material treatment. In particular, the calcium concentration dropped with increasing adsorbing material dosage, while the magnesium concentration increased with increasing adsorbing material dosage.

Figure 5:
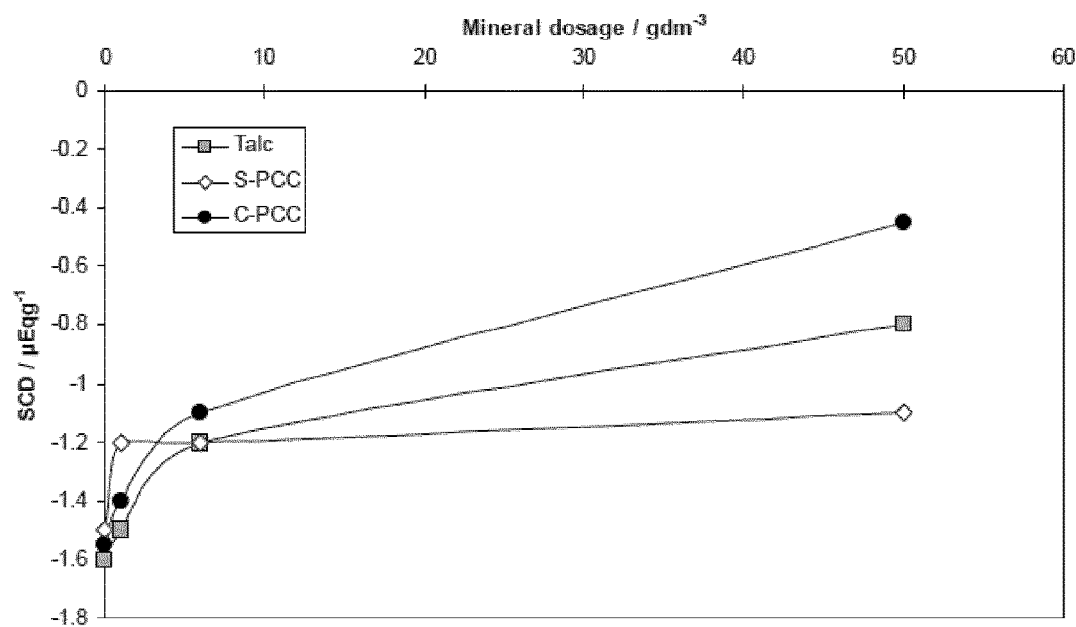
FIG. 5: Shows TMP/Adsorbing Material Sample SCD—cPCC was the most efficient adsorbing material for reducing the anionic charge of the TMP filtrate.

As can be gathered from FIG. 5, the cPCC was the most efficient adsorbing material for reducing the anionic charge of the TMP filtrate.

Figure 6:
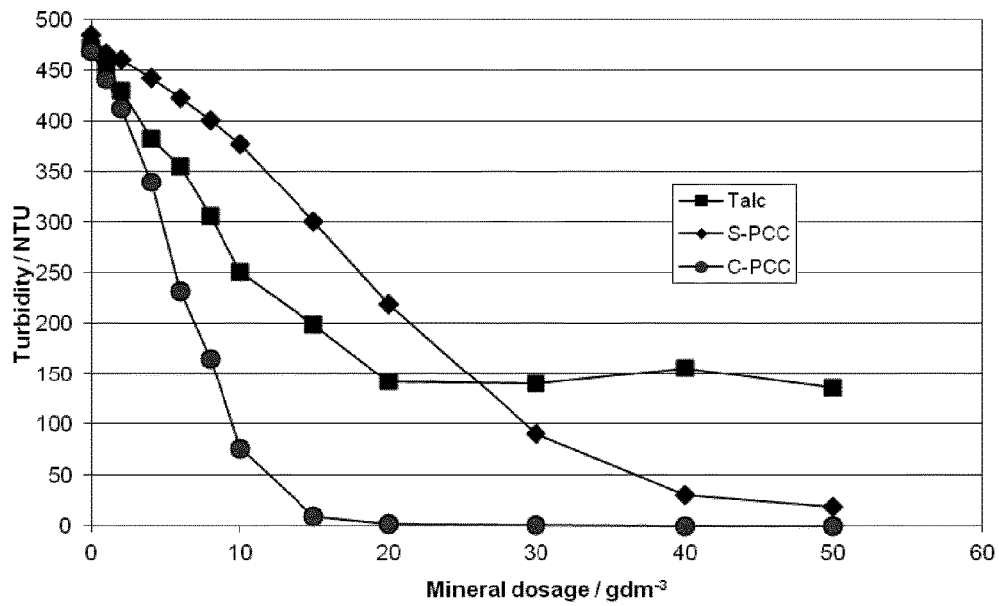
FIG. 6: Shows TMP/Adsorbing Material Sample turbidity—the strongest reduction in turbidity was measured for the cPCC.
Figure 7:
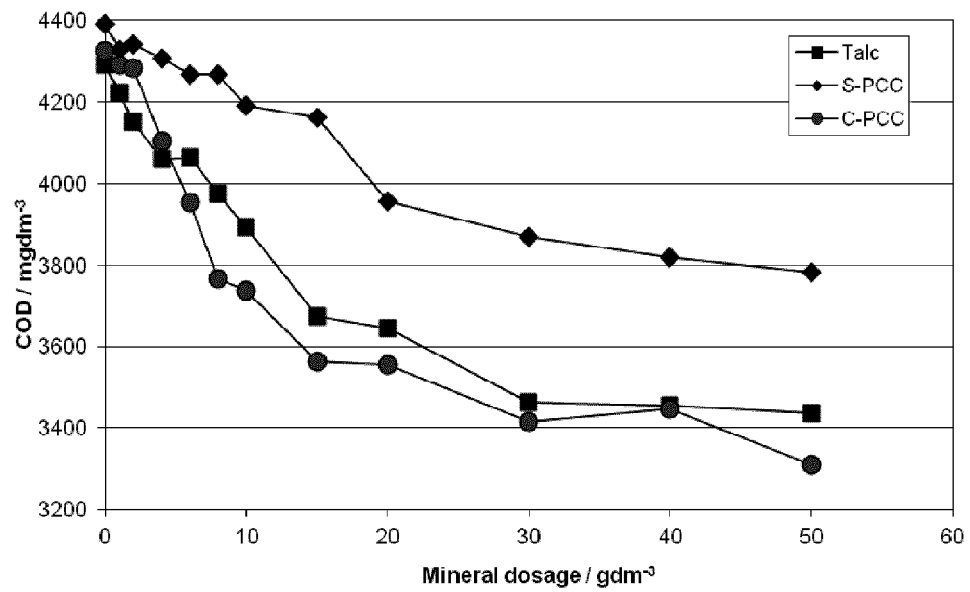
FIG. 7: Shows TMP/Adsorbing Material Sample chemical oxygen demand—the high potential of the cPCC shows it as an efficient adsorbing material for wood resin constituents.
Figure 8:
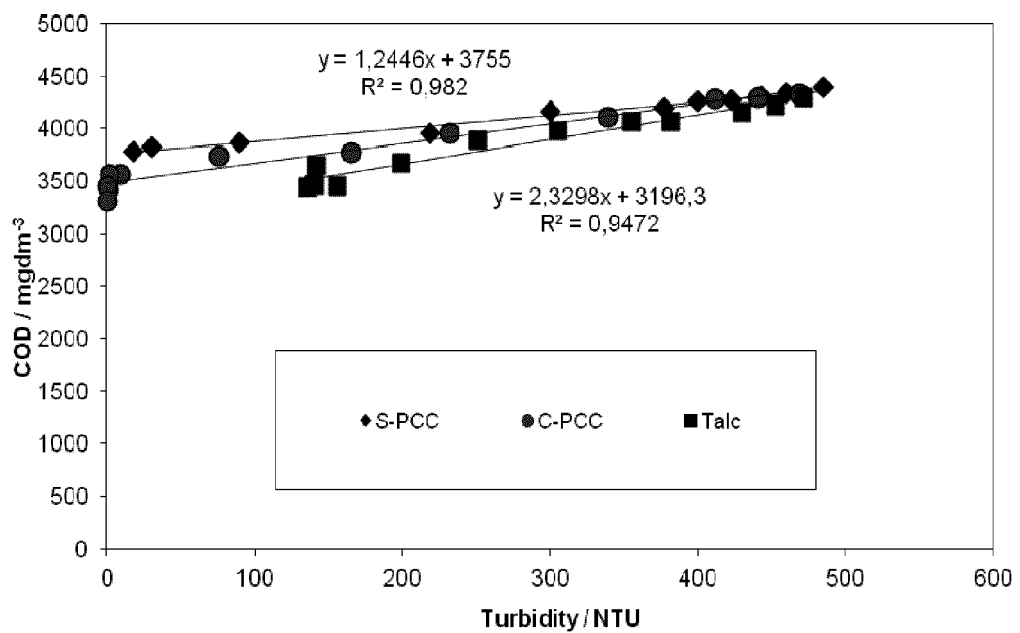
FIG. 8: Shows TMP/Adsorbing Material Sample—plot of COD versus turbidity.

All three adsorbing materials clearly reduced the turbidity of the TMP filtrate (FIG. 6). However, the strongest reduction in turbidity was measured for the cPCC. Talc showed for low dosages a medium reduction. A talc addition of more than 20 g/L aqueous medium did not further reduce the turbidity. Initially, the sPCC showed the weakest turbidity reduction but exceeded the talc above a dosage of 20 g/L aqueous medium. The turbidity analysis for the cPCC showed a great potential in collecting colloidal and therefore extractable material from the TMP filtrate. Similarly, the analysis of the chemical oxygen demand (FIG. 7) showed the high potential of the cPCC as an efficient adsorbing material for wood resin constituents. It can be further noted that talc performed nearly as good as the cPCC in the COD analysis. This can be attributed to the high affinity of talc to the dissolved fraction in particular hemicelluloses and lignin. A plot of COD versus turbidity (FIG. 8) illustrated that well. The steepness of the linear region indicated the ratio of colloidal to dissolved material that was adsorbed. Below a certain turbidity level the data for cPCC deviated from the linear behavior indicating a change in the ratio of dissolved versus colloidal material towards the dissolved fraction.

Figure 9:
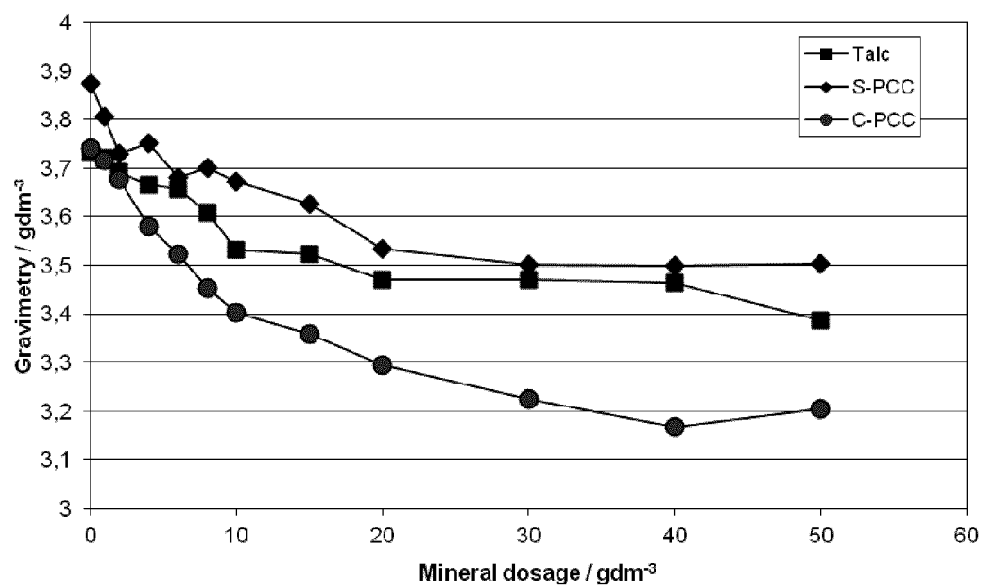
FIG. 9: Shows TMP/Adsorbing Material Sample—quantification of the gravimetric residue.

The quantification of the gravimetric residue (FIG. 9) confirmed the data obtained for the turbidity analysis. In particular, it can be gathered that cPCC reduced the gravimetric residue most efficiently. This is followed by talc again reaching a value where the reduction was stopped (>20 g/L aqueous medium).

Thus, it can be concluded that all adsorbing materials tested in the present application act to adsorb dissolved and colloidal substances from a TMP filtrate and thus are effective in reducing the amount of organic materials in the TMP filtrate. However, cPCC was surprisingly found to be the most efficient adsorbing material as can be gathered from the turbidity, COD and gravimetric analysis.

The invention claimed is:

1. A method for adsorbing and/or reducing the amount of at least one organic material in an aqueous medium comprising contacting the aqueous medium with a colloidal precipitated calcium carbonate (cPCC) to adsorb and/or reduce the amount of at least one organic material in the aqueous medium by forming a composite comprising the cPCC and the at least one organic material, and separating the composite from the aqueous medium, wherein the cPCC has a specific surface area of at least 5.0 $m^2/g$, measured using nitrogen and the BET method.

2. The method according to claim 1, wherein the cPCC has a specific surface area from 5.0 $m^2/g$ to 200.0 $m^2/g$, measured using nitrogen and the BET method.

3. The method according to claim 1, wherein the cPCC has a specific surface area from 10.0 $m^2/g$ to 100.0 $m^2/g$, measured using nitrogen and the BET method.

4. The method according to claim 1, wherein the cPCC has a specific surface area from 15.0 $m^2/g$ to 50.0 $m^2/g$, measured using nitrogen and the BET method.

5. The method according to claim 1, wherein the cPCC comprises aggregates having a weight median particle diameter $d_{50}$ value from 0.1 to 50.0 µm, measured according to the sedimentation method.

6. The method according to claim 1, wherein the cPCC comprises aggregates having a weight median particle diameter $d_{50}$ value from 0.2 to 25.0 µm, measured according to the sedimentation method.

7. The method according to claim 1, wherein the cPCC comprises aggregates having a weight median particle diameter $d_{50}$ value from 0.3 to 10.0 µm, measured according to the sedimentation method.

8. The method according to claim 1, wherein the cPCC comprises aggregates having a weight median particle diameter $d_{50}$ value from 0.4 to 5.0 µm, measured according to the sedimentation method.

9. The method according to claim 1, wherein the cPCC comprises aggregates consisting of single crystals having a weight median particle diameter $d_{50}$ value from 0.01 to 5.0 µm, measured according to the sedimentation method.

10. The method according to claim 1, wherein the cPCC is in a form of aggregates consisting of single crystals having a weight median particle diameter $d_{50}$ value from 0.02 to 2.5 µm, measured according to the sedimentation method.

11. The method according to claim 1, wherein the cPCC is in a form of aggregates consisting of single crystals having a weight median particle diameter $d_{50}$ value from 0.03 to 1.0 µm, measured according to the sedimentation method.

12. The method according to claim 1, wherein the cPCC is in a form of aggregates consisting of single crystals having a weight median particle diameter $d_{50}$ value from 0.04 to 0.5 µm, measured according to the sedimentation method.

13. The method according to claim 1, wherein the cPCC is in powder form or in form of an aqueous suspension comprising the cPCC and having a pH of ≥6.0, measured at 20° C. (±1° C.).

14. The method according to claim 1, wherein the cPCC is:
    a) surface-treated with at least one aliphatic carboxylic acid having a total amount of carbon atoms from C4 to C24, or stearic acid, and/or
    b) stabilized with one or more dispersants, one or more cationic dispersants, and/or one or more anionic dispersants.

15. The method according to claim 1, wherein the cPCC is used in combination with at least one further adsorbing material selected from the group consisting of talc, kaolin, calcined kaolin, natural calcium carbonate selected from marble, chalk, calcite, limestone and dolomite, non-colloidal PCC, gypsum, a silicate-containing mineral, a hydroxide-containing mineral, a calcium sulfoaluminate, plastic particles, organic pigments, surface-reacted calcium carbonate, hydrophobised GCC, hydrophobised PCC, and any mixture thereof.

16. The method according to claim 15, wherein the amount of the at least one further adsorbing material is ≤25.0 wt.-%, based on the total dry weight of cPCC and the at least one further adsorbing material.

17. The method according to claim 15, wherein the amount of the at least one further adsorbing material is ≤10.0 wt.-%, based on the total dry weight of cPCC and the at least one further adsorbing material.

18. The method according to claim 15, wherein the amount of the at least one further adsorbing material is ≤5.0 wt.-%, based on the total dry weight of cPCC and the at least one further adsorbing material.

19. The method according to claim 15, wherein the amount of the at least one further adsorbing material is ≤2.0 wt.-%, based on the total dry weight of cPCC and the at least one further adsorbing material.

20. The method according to claim 1, wherein the cPCC is used in combination with at least one further adsorbing material selected from the group consisting of talc, surface-reacted calcium carbonate, hydrophobised GCC, hydrophobised PCC, and any mixture thereof.

21. The method according to claim 1, wherein the aqueous medium comprising at least one organic material is generated in a papermaking or pulping process, is bleached or unbleached pulp, mechanical pulp, ground pulp, thermomechanical pulp (TMP), chemothermomechanical pulp (CTMP), kraft pulp, sulfate pulp, recycled pulp, or any mixture thereof.

22. The method according to claim 21, wherein the cPCC is added to the aqueous medium in an amount from 0.05 to 90.0 wt.-%, based on total weight of oven dry (100° C.) fibers in the aqueous medium.

23. The method according to claim 21, wherein the cPCC is added to the aqueous medium in an amount from 0.1 to 50.0 wt.-%, based on total weight of oven dry (100° C.) fibers in the aqueous medium.

24. The method according to claim 21, wherein the cPCC is added to the aqueous medium in an amount from 0.25 to 25.0 wt.-%, based on total weight of oven dry (100° C.) fibers in the aqueous medium.

25. The method according to claim 21, wherein the cPCC is added to the aqueous medium in an amount from 0.5 to 10.0 wt.-%, based on total weight of oven dry (100° C.) fibers in the aqueous medium.

26. The method according to claim 21, wherein the cPCC is added to the aqueous medium in an amount from 0.5 to 5.0 wt.-%, based on total weight of oven dry (100° C.) fibers in the aqueous medium.

27. The method according to claim 1, wherein the at least one organic material in the aqueous medium is at least one dissolved and/or colloidal material generated in a papermaking or pulping or paper recycling process.

28. The method according to claim 27, wherein the at least one dissolved and/or colloidal material is/are:
 a) originated from wood and/or wood resins, and are selected from the group consisting of polysaccharides, hemicelluloses, lignin, starch, pectins, resin acids, fats, fatty acids, fatty alcohols, terpenes, terpenoids, polyisoprenes, sterols, steryl esters, waxes and any mixture thereof, and/or
 b) originated from paper coatings, coating binders, printing inks, de-inking chemicals, hot melts and/or adhesives.

29. The method according to claim 1, wherein the at least one organic material in the aqueous medium is selected from the group consisting of an endocrine disrupting compound (EDC), an endogenous hormone, 17[beta]-estradiol (E2), estrone (E1), estriol (E3), testosterone, dihydro testosterone, a phyto hormone, a myco hormone, [beta]-sitosterol, genistein, daidzein, zeraleon, 17[alpha]-ethinylestradiol (EE2), a drug, mestranol (ME), diethylstilbestrol (DES), an industrial chemical, 4-nonyl phenol (NP), A-tert-octyl phenol (OP), bisphenol A (BPA), tributyltin (TBT), methylmercury, a phthalate, PAK, PCB, or any mixture thereof.

30. The method according to claim 1, wherein after the addition of the cPCC:
 a) the turbidity of the aqueous medium is reduced compared to the turbidity of an aqueous medium without the use of the cPCC, and/or
 b) the chemical oxygen demand (COD) of the aqueous medium is reduced compared to the COD of an aqueous medium without the use of the cPCC, and/or
 c) the electrochemical charge (SCD) of the aqueous medium is increased compared to the electrochemical charge of an aqueous medium without the use of the cPCC.

31. The method according to claim 1, wherein the aqueous medium, after the addition of the cPCC in an amount of at least 10 g/L aqueous medium, has:
 a) a turbidity being at least 20%, below the turbidity (NTU) of the aqueous medium before the addition of the cPCC, and/or
 b) a chemical oxygen demand (COD) being at least 1.0%, below the COD (mg/L) of the aqueous medium before the addition of the cPCC, and/or
 c) an electrochemical charge (SCD) being at least 5% above the electrochemical charge (µEq/g) of the aqueous medium before the addition of the cPCC.

32. The method according to claim 1, wherein the aqueous medium, after the addition of the cPCC in an amount of at least 10 g/L aqueous medium, has:
 a) a turbidity being at least 40% below the turbidity (NTU) of the aqueous medium before the addition of the cPCC, and/or
 b) a chemical oxygen demand (COD) being at least 5.0% below the COD (mg/L) of the aqueous medium before the addition of the cPCC, and/or
 c) an electrochemical charge (SCD) being at least 15% above the electrochemical charge (µEq/g) of the aqueous medium before the addition of the cPCC.

33. The method according to claim 1, wherein the aqueous medium, after the addition of the cPCC in an amount of at least 10 g/L aqueous medium, has:
 a) a turbidity being at least 50% below the turbidity (NTU) of the aqueous medium before the addition of the cPCC, and/or
 b) a chemical oxygen demand (COD) being at least 10.0% below the COD (mg/L) of the aqueous medium before the addition of the cPCC, and/or
 c) an electrochemical charge (SCD) being at least 20% above the electrochemical charge (µEq/g) of the aqueous medium before the addition of the cPCC.

34. The method according to claim 1, wherein the aqueous medium, after the addition of the cPCC in an amount of at least 10 g/L aqueous medium, has:
 a) a turbidity being at least 75% below turbidity (NTU) of the aqueous medium before the addition of the cPCC, and/or
 b) a chemical oxygen demand (COD) being at least 20.0% below the COD (mg/L) of the aqueous medium before the addition of the cPCC, and/or
 c) an electrochemical charge (SCD) being at least 25.0% above the electrochemical charge (µEq/g) of the aqueous medium before the addition of the cPCC.

35. The method according to claim 1, wherein the aqueous medium, after the addition of the cPCC in an amount of at least 10 g/L aqueous medium, has:
- a) a turbidity being at least 90.0% below the turbidity (NTU) of the aqueous medium before the addition of the cPCC, and/or
- b) a chemical oxygen demand (COD) being at least 50.0% below the COD (mg/L) of the aqueous medium before the addition of the cPCC, and/or
- c) an electrochemical charge (SCD) being at least 50.0% above the electrochemical charge ($\mu$Eq/g) of the aqueous medium before the addition of the cPCC.

* * * * *